Nov. 20, 1934.  J. W. WOODRUFF  1,981,296
CLIP
Filed July 17, 1933
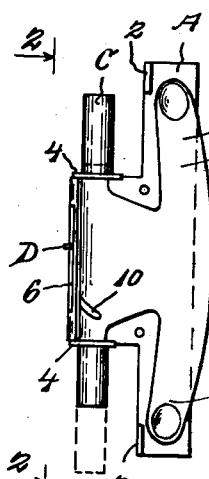
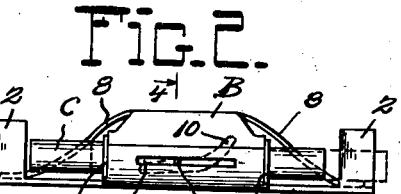
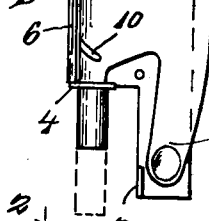
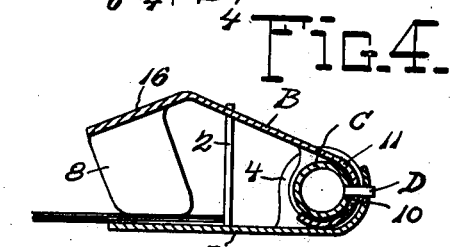
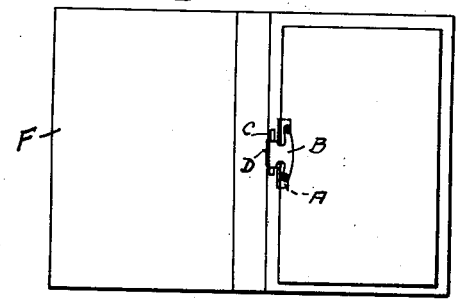
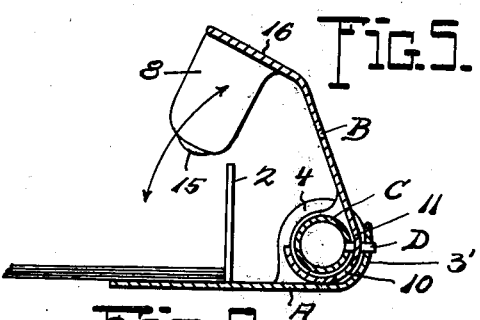
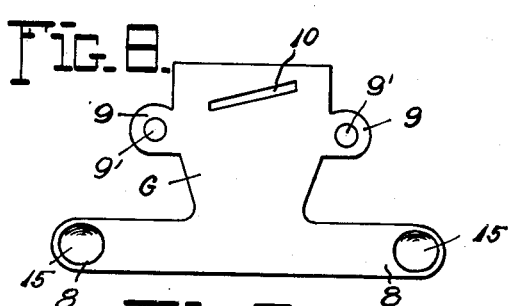
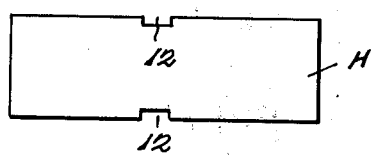
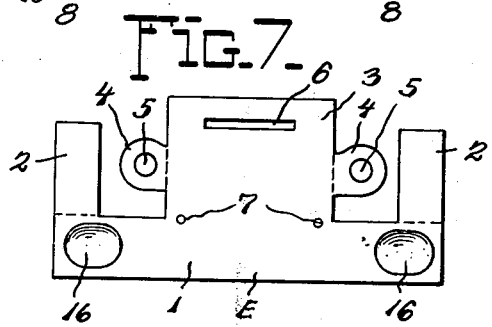
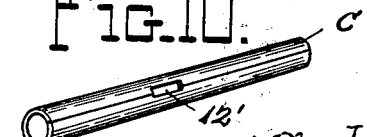
Inventor
JACOB W. WOODRUFF.
By Robbs Robb
Attorneys Patented Nov. 20, 1934

1,981,296

UNITED STATES PATENT OFFICE 1,981,296

CLIP

Jacob W. Woodruff, Cleveland, Ohio

Application July 17, 1933, Serial No. 680,859

12 Claims. (Cl. 24—66)

This invention relates to a clamping device for use in holding together papers and the like in temporary or permanent bound relation, or it may be employed in conjunction with protective folders wherein the unit may be attached to and will form a part of the aforesaid folders.

This invention contemplates the provision of a clamping device possessed of several advantageous features that make it attractive both from the salable and production standpoints. It is extremely easy to operate and yet will hold the material to be clamped firmly and positively regardless of the number of sheets to be held, up to the capacity of the device; however, may be easily released to afford removal of the papers or the insertion of other papers. From a production standpoint it embodies elements such that each may be produced from inexpensive stock and cheaply and easily pressed and/or stamped to a desired configuration and subsequently assembled quickly and easily.

Particularly, the clamping device includes three main elements, one of which is a base member and against which the papers or like material are clamped. This base member may be attached to a binder or folder and provides a mounting for the remainder of the assembly. The second member may be called a clamping member which is intended to clamp the papers to be held between it and the base member, and the third member takes the form of a locking device joining all the parts together and through a peculiar and novel arrangement of parts to be hereinafter described, affords the locking of the clamp in positions of adjustment with respect to the base.

It may be therefore seen that one object of this invention is to provide a clamping device that will positively and firmly hold the material to be clamped, yet may be operated with a minimum of effort for both locking and release operations. Another object is to provide a very simple mechanism of the kind described which may be cheaply and easily manufactured, assembled, and marketed at an attractive price. A further object is to provide an assembly capable of use with ordinary forms of covered binders.

Other objects and advantageous features of this invention are to be found in the following detailed description and accompanying drawing, wherein like characters of reference designate corresponding parts, wherein—

Figure 1 is a top plan view of the clamping device with all of the parts in assembled relation.

Figure 2 is a rear elevation looking in the direction of the arrows 2—2 of Figure 1.

Figure 3 is an end elevation looking in the direction of the arrows 3—3 of Figure 2.

Figure 4 is a vertical section taken on the line 4—4 of Figure 2.

Figure 5 is a section corresponding to that of Figure 4, however showing the clamping device in raised position to allow the insertion or removal of material such as paper or the like to be held.

Figure 6 illustrates the clamping device in the environment of one of its uses, namely in conjunction with a folder such as that commonly employed for notebooks, binders, etc.

Figure 7 illustrates the blank from which the base member is formed.

Figure 8 is a view showing the blank from which the clamping member is formed.

Figures 9, 10, and 11 respectively, illustrate the method of forming the slider or the third member of the assembly through the steps of forming the blank, rolling the same into a tube and punching out a portion of the sleeve for purposes to be hereinafter described.

The invention herein has to do essentially with a clamping device which is made up of three parts, namely, a base member, a clamping member, and a locking slide. This description will take up first the manner in which the various elements are formed and assembled, which will give a clearer insight into the nature of the elements that go to make up the whole assembly and will facilitate an understanding of the operation thereof; next I will describe the clamp means per se and its operation, and lastly will devote the description to the uses of the device.

However, I may point out that the device as shown in Figures 1 to 5 inclusive includes the base member A, a clamping member B and a locking slider or bearing pin C, the clamping member being adapted to be pressed downwardly toward the base member to grip the material to be held therebetween by the pressure of the hand or fingers, whereupon the locking slider C will be moved to the left as in Figure 2 to wedge a camming element D on the slider C against the walls of a pair of slots in which it works, thereby permitting the locking of the assembly in various positions of adjustment.

With the foregoing brief explanation of the elements of the assembly and the operation of the device in mind, I now turn to Figures 7 to 11 inclusive which disclose the elements of the assembly at various stages in the production thereof.

The base member A of Figure 1 has been shown in Figure 7 as it would appear immediately after stamping and has been designated by the reference character E, wherein the bottom portion, 1, has extensions 2 that are to be upturned to form back stops for aligning the pages of material to be held. The central zone of the blank as at 3 has oppositely disposed ears 4 that are perforated as at 5 and which are intended to be turned upwardly in parallelism to provide bearings for the reciprocation of the slider C, as in Figure 2. A slot 6 is formed in the central zone C along a line above the ears 4 and is intended to provide a working space for the cam D of the slider C. In its completed form, the zone of the central portion 3, from a point in the vicinity of the ears 4 to the outer edge, is turned upwardly to provide a semi-circular portion 3' as in Figures 4 and 5. This brings the slot 6 into the position shown in Figure 2 wherein it lies in substantial parallelism with the axis of the bearing members 5. If desired, the central zone 3 may be perforated at spaced points as at 7 for the reception of small rivets or screws to hold the device in a binder as at F in Figure 6. In addition, elongated depressions are formed in the metal at the end zones of the portion 1, and are identified by reference character 16. These depressions will be hereinafter referred to.

The blank of Figure 8 indicated by the reference character G is the element which is fashioned to produce the clamping member B. The body portion of this blank at its forward end extends as at 8 on each side of the center line and during the process of forming, these portions are bent downwardly to produce spring legs having end portions that will lie substantially against the material to be held. The main body portion of the blank is provided with ears 9 that are each perforated as at 9' and are intended to be bent downwardly to provide opposed bearing members having aligned apertures for aligning, in the assembly, with the apertures 5 of the parts 4 of blank E. This blank is provided with an elongated, substantially rectangular, slot 10 disposed at an angle with relation to the slot 6, and the body portion of the blank from the vicinity of the ears 9 to the edge and rear of the slot 10 is turned to provide a semi-cylindrical portion 11 for nesting relation with the portion 3 and the final assembly as shown best in Figures 4 and 5. The slot 10, in the assembly, takes the positional relation with respect to the slot 6 as shown in Figure 2 wherein one end lies above the slot and the other end lies substantially below the slot with the clamping element in lowered position which will be hereinafter referred to more particularly with regard to the operation of the device, the bearings being also intended to receive the slider C with the cam element D extending through the slot 10 and lying in the slot 6.

To allow the spring legs 8 of the clamping device to cooperate properly with the base member A, the blank has been bent as shown at Figure 4 in the zone 16 which affords, in addition, a portion for receiving the thumb of the hand or the fingers so that the legs of the clip may be forced to firm engagement with the material to be held, as will be referred to hereinafter. It is to be observed too, that the end zones of the legs 8 are provided with parts 15 that may be formed during the production of the blank, which are intended to seat in and cooperate with the elongated depressions 16 in the base member and which are particularly advantageous in securely holding loose sheets of paper or other material. The action is such that parts force the paper into the depressions and thereby supplement the bond between the material held and the clamp as will be apparent.

Turning now to a consideration of Figures 9, 10, and 11, I have shown in Figure 9 a blank H which as stamped, is provided with notches 12 lying in opposed relation that when the blank is rolled into a cylinder cooperate to form a slot 12' as shown in Figure 10. Now this cylinder forms a locking slider C of the assembly in Figure 1 and acts as a means for tying the other two parts of the assembly together and is intended to lie in bearings afforded just mentioned in connection with the description of the blanks in Figures 7 and 8.

The slot 12' forms no active part of the combination, however, permits of the insertion of a tool after the parts have been assembled in the relation shown in Figures 1 and 2 to punch out the small cam member D, whereupon all of the parts of the assembly are locked into an integral whole. This may be accomplished by assembling the base member and clamping member on the slider, with the slider lying in the bearings and placing the same in a jig and bringing the tool, which is shown at J in Figure 11, downwardly through the notch 12', the bevel face of the tool breaking away the material along three sides as shown. Now when the parts are placed in a jig the slots 6 and 10 are aligned as shown in Figure 2 and the slider C centered so that the descending tool J will punch out the cam member D in the zone defined by the walls of the two slots at any point where they may coincide to provide an opening clear through the device. In this manner the parts are positively locked together and the device is ready for use for its intended purpose albeit other operations of a finishing nature may be performed thereon to make the same more attractive and pleasing to the prospective purchaser.

The cam element D on the slider C is intended to work in the slot 6 and its movement is guided and governed by the walls of this slot so that it may be said that the cam and hence the slider, reciprocate in a horizontal plane, Figure 2, and along the axis of the slider. In operating the clamping device, the clamping member B is opened and the material to be held inserted as in Figure 9 and then the part B is closed, bringing the legs into engagement with the material, whereupon pressure is brought to bear upon the material by forcing downwardly on the zone 16, Figure 5, with the thumb or the fingers of the hand. During this action, the slider C has been moved to the left across the device by virtue of the camming relation that will result from the rotation of the clamping element B since the lower wall of its slot 10 is disposed at substantially an angle to the cam D and would engage the same and cause it to be moved. To lock the device, it is only necessary to move the slider C to the left further under the pressure of the fingers and bring the cam member into firm engagement with the upper wall of the slot 10, it being quite apparent that a wedging action will result between the cam and the walls of the slot 6 and the upper wall of the slot 10. When the pressure is released in the zone 16, the legs 8 resiliently urge the clamping element B upwardly and in a counter-clockwise direction about its rotational axis which further tends to increase the efficiency of the locking arrangement.

To release the lock, it is advantageous to relieve the spring tension on the cam member by forcing the clamping member downwardly as hereinbefore set out and then moving the slider to the right as in Figure 2, which causes the cam element D to break out of wedging relation with the upper wall of the slot, whereupon the clamp and base may be spread manually to release the material.

Albeit I have mentioned that the slider C acts primarily as a device for locking the member B after it has been moved by the fingers of the hand to clamping position, it is clearly apparent from the construction that movement of the slider C along its axis in either direction will produce rotation of the clamping element B by virtue of the cam member D cooperating with the upper or lower wall of the slot 10 according to the direction of movement. It is well within the scope of this invention that the clamping member be moved into clamping relation or removed out of clamping position merely through the movement of the locking slider C.

It is to be pointed out that the clamping member B, slider C, and base member A all have complemental axes, namely, the axis of the slider C, so that it may be said that the clamping member B rotates about the axis of the slider C into and out of clamping relation with the material to be held.

As for the uses of the device, it has already been mentioned that it may be employed to hold papers such as business letters, invoices, bills, etc., where it is to be used as a temporary means for clamping these papers together, which may be easily unlocked merely by pressing downwardly on the clamping member B to relieve resilient pressure on the cam member D and then sliding the locking member D downwardly or to the right as in Figure 1 or the device may be used as a permanent clamp for holding yearly files that are to be placed away for safe keeping. Ordinarily, files of this nature are provided with a backing and may or may not take the form shown in Figure 6. In Figure 6 I have shown the device used in connection with a paper back binder and as attached to the same by means of rivets as aforesaid. Either one, or two, or more of these devices may be used in conjunction with folders of this kind, according to the size of the folders and the material to be held. The device may also be used with other types of protective covers and affixed thereto in the manner suggested or in any other manner that will subserve the same end.

From the foregoing description it will be seen that I have provided a very novel clip member that is made up of a minimum of parts and is extremely economical to manufacture, not to mention the benefits and advantages that flow from the construction both as to the variance of use to which it may be put and the ease with which it may be used.

Obviously, various modifications will occur to those familiar with the art, which are well within the scope of this invention, and I therefore do not care to be limited by the exact construction shown, only as indicated in the appended claims.

Having thus described my invention, what I claim as new and desire to secure by Letters Patent of the United States, is—

1. A clamping device of the class described, comprising, in combination, a pair of members for receiving material to be held therebetween, said members being relatively movable about a complemental axis, and means for locking said members in any one of a number of positions of adjustment when at least one of said members meets with resistance, which comprises a tubular member lying on the axis of rotation of the two parts and being reciprocable and having a part extending normal thereto and beyond the circumference of the tubular member for wedging relation with the first mentioned parts.

2. A clamping device which comprises, in combination, a base member, a clamping member rotatable about an axis offset to one side of the base member toward and away from said base member, a locking slide forming the axis of rotation for the clamping element, said slide being movable to various positions to lock said clamping element in one or more positions.

3. A clamping device which comprises, in combination, a base member having an integral offset portion provided with upstanding ears perforated to form bearings, a clamping member having a body portion provided with ears perforated to form bearings and adapted to cooperate with the first named bearings, a slider member lying within the bearings and joining the said parts, a slot in each of said base and clamping members, and a part on said slider member normal to the axis of the tube and lying in said slots and working therein for wedging movements with the walls of said slots.

4. A clamping device which comprises, in combination, a base member having an integral offset portion provided with upstanding ears perforated to form bearings, a clamping member having a body portion provided with ears perforated to form bearings and adapted to cooperate with the first named bearings, a slider member lying within the bearings and joining the said parts, a slot in each of said base and clamping members, and a part on said slider member normal to the axis of the tube and lying in said slots and working therein for wedging movements with the walls of said slots, said part locking said assembly against separation.

5. A clamping device which comprises, in combination, a base member having an integral offset portion provided with upstanding ears perforated to form bearings, a clamping member having a body portion provided with ears perforated to form bearings and adapted to cooperate with the first named bearings, a tubular member lying within the bearings and joining the said parts, a slot in each of said base and clamping members, and a part on said tubular member normal to the axis of the tube and lying in said slots and working therein for wedging movements with the walls of said slots, said part being punched out when said tube is mounted in assembled relation with the base and the clamping member.

6. In a clamping device, a pair of members, one of which is rotatable with respect to the other and adapted to be moved toward and away from the other member to grip material to be held therebetween, and means for locking said movable element in one or more positions of adjustment with respect to the other element, all first said members having a complemental axis of rotation about the locking means.

7. The method of assembling a three-part clamping device for locking the parts thereof in assembled relation which consists in assembling the three parts into a non-permanently joined union and then punching out a portion of one of the parts to lock all of the parts together.

8. The method of assembling the elements of a clamping device and joining the same in non-separable relation wherein the device consists in a base member, a clamping member and a tubular slider which consists in assembling the clamping member on the base member and both of said members on the tubular slider and thereafter deforming the slider to inseparably join the parts together.

9. The method of inseparably joining the individual elements of a three-part clamping device, which includes a base member, a clamping member, and a tubular slider, and wherein the base member and clamping member are provided with registering slots which consist in assembling the base member and the clamping member on the slider, bringing the notches into registry, and punching out a portion of the slider in the zone of the notches.

10. In a device for clamping papers or the like, the combination of a base member, a clamping member, a slider comprising a bearing pin, bearing elements on each member slidably and rotatably embracing said bearing pin, and a lateral projection on said bearing pin, said base and clamping members having cam surfaces engaging the lateral projection on said bearing pin to cause opening and closing by relative rotatable movement of said members upon longitudinal movement of the bearing pin.

11. In a device for clamping papers or the like, the combination of a base member, a coacting clamping member, a slider forming a bearing pin, bearing elements on each member slidably and rotatably embracing said bearing pin and a lateral projection on said bearing pin, said members having cam surfaces engaging the lateral projection on said bearing pin to cause opening and closing relative movement of said members upon longitudinal movement of the bearing pin, said cam surface having a portion at a slight angle for locking in any number of positions and a more abrupt angle portion for quick opening and closing.

12. A clamping device which comprises a base member and a clamping member movable toward said base member to grip material to be held therebetween, and means for urging said clamping member toward said base member and locking the same with respect thereto, which includes a slider lying on the axis of rotation of the clamping member and having a part integral therewith for cooperation with said base member and said clamping member, said base member and said clamping member having elongated openings therein for the reception of said part, the walls of the opening in said base member serving as a guide for said part to prevent rotation of the slider during reciprocation, whereby said part through engagement with the walls of the opening in the clamping member is afforded a camming relation therewith to urge the same about its axis and to lock the same in various positions of adjustment when said clamping element meets with resistance.

JACOB W. WOODRUFF.